United States Patent Office 3,391,483
Patented July 9, 1968

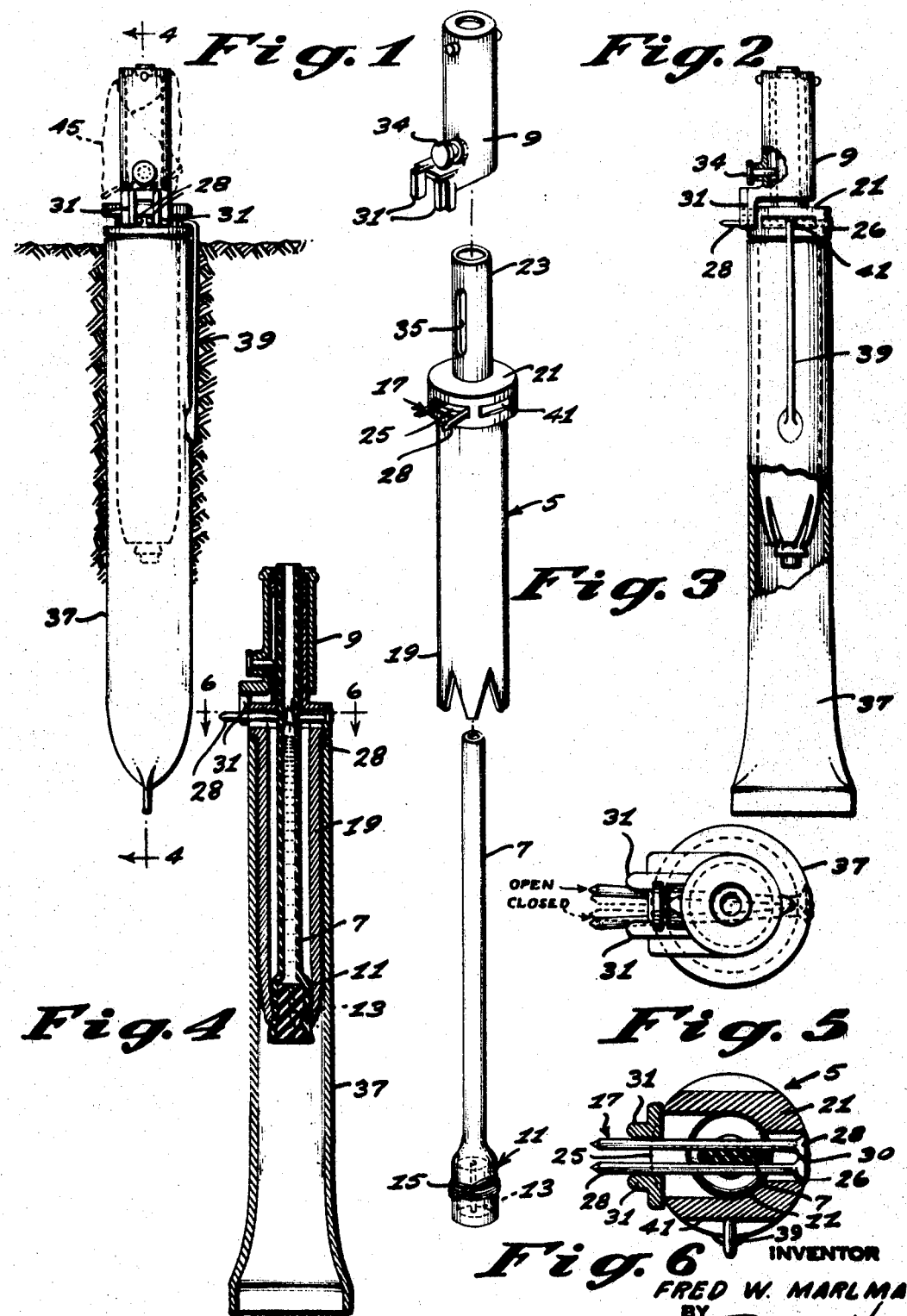

3,391,483
FLUID GUN
Fred W. Marlman, P.O. Box 2172, Station A,
Pueblo, Colo. 81004
Filed July 1, 1966, Ser. No. 562,343
7 Claims. (Cl. 43—84)

ABSTRACT OF THE DISCLOSURE

The present invention relates to trigger actuated mechanism for projecting a fluid and more specifically to a device for squirting a toxic chemical into the mouth of a coyote or other predatory animal at such time as the animal attempts to remove the exposed bait from the mechanism trigger.

---

Ranchers, cattlemen and sheepherders have for a long period of time waged a battle against predatory animals, such as coyotes, which kill stock and deplete the herds. Traps of various descriptions have seen use since the need began, however, traps are subject to a great many disadvantages. To mention only a few, traps are cumbersome and expensive; they are not selective in what they catch and they are inhuman in their operation. To overcome these and other disadvantages of traps, a chemical cartridge was developed which employed an explosive shell to propel the chemical or poison into the mouth of the animal. The shell was detonated by a trigger mechanism actuated by the animal. Although used successfully for many years and in large numbers, the fact that an explosive shell was employed in the operation of the device created certain dangers in the setting and handling of such devices. In addition, age, moisture, dirt, etc. would often foul the operation of the device and prevent the desired result from being achieved.

It is therefore the primary object of the present invention to provide apparatus which will overcome the deficiencies of the prior art and will not be subject to the malfunctions incident to the prior apparatus.

A further object of the invention is to eliminate the requirement for live ordinance in devices of this general type.

Other and still further objects, features and advantages of the invention will become apparent from a full understanding of a preferred form of the device as explained in the following specification taken in conjunction with the accompanying drawings in which:

FIGURE 1 is a side view of the fluid gun of the present invention showing the ground in which the device is embedded in cross section.

FIGURE 2 is a front view of the fluid gun of the present invention with a portion of the casing broken away to more clearly show the features of the cartridge therein.

FIGURE 3 is an exploded view of the cartridge, the trigger and the elastic container tube.

FIGURE 4 is a cross sectional view of the fluid gun taken along lines 4—4 in FIGURE 1.

FIGURE 5 is a top plan view of the gun showing the closed position of the pincer means in phantom.

FIGURE 6 is a cross sectional view taken along lines 6—6 of FIGURE 4.

Briefly, the invention includes an elastic container having an elongated neck and open mouth, through which a fluid in the container may be ejected, and a pincer means normally squeezing the said neck to such an extent as to close the passage therethrough. A trigger is provided which is linked to a piece of bait and to the pincer means so as to release the pincers upon proper movement of the bait. Hydrostatic pressure of the fluid within the container will then force the fluid through the neck and mouth of the container.

Referring now to the drawings, FIGURE 3 shows, in an exploded view, a cartridge 5 which mounts an elastic container 7 interiorly thereof and a trigger 9. In the preferred form the container 7 is formed from a soft rubber tube having an enlarged end 11 which is made by inserting a solid stopper 13 into the tube and securing it in place with a tie 15 wrapped around the tube end 11. The cartridge 5 which houses the tube 7 and supports the pincer means 17 and trigger 9 includes in an integrally molded piece a first cylinder 19, an enlarged diameter flange 21 and a reduced diameter second cylinder 23 coaxial with said first cylinder 19. The peripheral edge of the pincer mounting flange 21 is provided with diametric slots 25 and 26 which accommodate two pins 28 of the pincer means 17. The heads of the pins 28 are pivotally held in place in the smaller one of the slots 26 by a rubberized cement 30 or similar vulcanized seal into which the heads of the pins are embedded. As seen clearly in FIGURES 5 and 6, the pins 28 are intended to be positioned so as to allow an open passageway through the tube 7 or to exert a squeezing pressure on the tube to close the passageway therethrough, the latter being shown in FIGURE 6.

In order to hold the pincer pins 28 in a closed position against the expanding force of the compressed rubber tube 7, there is provided on the slideable trigger 9 a pair of depending fingers 31 which bracket the pins 28, as shown in FIGURES 5 and 6. As the trigger is moved upwardly on its mounting cylinder 23 the pins 28 are freed from the constraint imposed by the fingers 31 and the tube is opened to allow the passage of fluid therethrough. Located in a boss on the side of the trigger cylinder 9 is a radially slideable pin 34 adapted to protrude into a longitudinal slot 35 in the mounting cylinder 23 of the cartridge 5. The pin and slot combination prevent the complete removal of the trigger 9 from its mounting cylinder 23 or rotation of the former with respect to the latter.

To facilitate the strategic placement of the fluid gun, the cartridge 5 is inserted into hollow casing 37 which is preferably pushed into the ground, as shown in FIGURE 1. A retainer clasp 39 is welded or otherwise attached to the side of the case 37 and comprises a springable wire having a right angle inwardly bent at the free end thereof which is designed to be lodged in a slot 41 in the flange 21 of the cartridge 5 to hold the cartridge in the casing 37.

The primary use of the fluid gun of the present invention is the extermination of coyotes and other predatory animals and for such purpose the gun may be loaded with a poisonous solution that will be ejected into the mouth of the animal as it attempts to remove meat or other bait 45 from the trigger 9. One solution that has proved to be relatively inexpensive and which provides quick effective results includes one pint of granular sodium cyanide dissolved in one and one-half pints of boiled distilled water. By adding a color dye to the water the animal can be marked or coded to indicate with which of many exterminator devices he came into contact.

The fluid solution may conveniently be loaded into the tube with the aid of a syringe and hypodermic needle which is inserted through the stopper 13 to communicate with the interior of the tube. Sufficient fluid is pumped into the tube 7 so as to expand the tube slightly and create sufficient internal pressure in the tube to forcibly eject the fluid when the pincer pins 28 are withdrawn by the removal of the trigger fingers 31.

Having thus described the several useful and novel features of the fluid gun of the present invention in connection with the accompanying drawings, it will be seen that the many worthwhile objectives for which it was designed have been achieved.

I claim:
1. A fluid gun for projecting a stream of liquid upon actuation of a trigger, including:
   an elastic container for storing a quantity of liquid under pressure and having an opening communicating with the interior thereof through an elongated neck portion;
   pincer means forming a pair of jaws embracing said neck portion and operable between an open and closed position to respectively open and close said opening; and
   a moveable trigger having finger means for bracketing the pincer means in the latter's closed position around the neck of said container.
2. The fluid gun of claim 1 and further including:
   a hollow cartridge housing said elastic container and mounting said pincer means.
3. The combination of claim 2 and further including:
   a protective casing housing at least a portion of said cartridge and adapted to be driven into the ground.
4. The fluid gun of claim 1 and further including:
   a cylindrical cartridge housing said elastic container and mounting the pincer means and wherein the trigger is slideably mounted on the cartridge cylinder.
5. The fluid gun of claim 1 wherein:
   said container is a rubberized tube;
   said jaws include a pair of pins forming an articulated V member;
   and further including:
   a hollow cartridge housing said tube interiorly thereof, said cartridge having:
      means mounting said jaws,
      means slideably mounting said trigger, and
      a casing housing at least a portion of said cartridge.
6. The fluid gun of claim 1 and further including a toxic liquid within the said elastic container.
7. The fluid gun of claim 6 wherein said toxic liquid contains a colored dye.

References Cited

UNITED STATES PATENTS

| | | | |
|---|---|---|---|
| 2,059,127 | 10/1936 | Marlman | 43—84 |
| 2,301,764 | 11/1942 | Wainwright | 43—84 |
| 2,512,252 | 6/1950 | Lehn | 43—84 |
| 2,654,178 | 10/1953 | Graybill | 43—84 |
| 2,709,024 | 5/1955 | Lemoine et al. | 222—215 X |
| 3,340,645 | 9/1967 | Poteet | 43—84 |

WARNER H. CAMP, *Primary Examiner.*